US012812237B2

(12) United States Patent
Soni et al.

(10) Patent No.: US 12,812,237 B2
(45) Date of Patent: Nov. 24, 2026

(54) METHOD AND SYSTEM FOR CAPTURING A VIDEO IN A USER EQUIPMENT

(71) Applicant: SAMSUNG ELECTRONICS CO., LTD., Suwon-si (KR)

(72) Inventors: Amit Kumar Soni, Bengaluru (IN); Debayan Mukherjee, Bengaluru (IN); Swadha Jaiswal, Bengaluru (IN); Rahul Kumar, Bengaluru (IN); Sai Pranav Mathivanan, Bengaluru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 215 days.

(21) Appl. No.: 18/752,361

(22) Filed: Jun. 24, 2024

(65) Prior Publication Data

US 2024/0348916 A1 Oct. 17, 2024

Related U.S. Application Data

(63) Continuation of application No. PCT/KR2022/020603, filed on Dec. 16, 2022.

(30) Foreign Application Priority Data

Dec. 24, 2021 (IN) ............................. 202141060688
Nov. 14, 2022 (IN) ............................. 202141060688

(51) Int. Cl.
*H04N 23/60* (2023.01)
*H04N 9/82* (2006.01)
(Continued)

(52) U.S. Cl.
CPC ........... *H04N 23/64* (2023.01); *H04N 9/8205* (2013.01); *H04N 19/46* (2014.11); *H04N 23/62* (2023.01); *H04N 23/667* (2023.01)

(58) Field of Classification Search
CPC ...... H04N 23/64; H04N 9/8205; H04N 19/46; H04N 23/62; H04N 23/667; H04N 5/93
See application file for complete search history.

(56) References Cited

U.S. PATENT DOCUMENTS 9,332,175 B2 5/2016 Jeong et al.
10,924,677 B2 2/2021 Kim et al.
(Continued)

FOREIGN PATENT DOCUMENTS

CN 113810602 A 12/2021
EP 3 029 676 A1 6/2016
(Continued)

OTHER PUBLICATIONS

Communication issued Jan. 21, 2025 by the European Patent Office in European Patent Application No. 22911787.4.
(Continued)

*Primary Examiner* — Timothy J Henn
(74) *Attorney, Agent, or Firm* — Sughrue Mion, PLLC

(57) ABSTRACT

A method for capturing a video in a User Equipment (UE) includes capturing a plurality of first frames of a video of a scene in a first mode upon detecting an initiation of a video capture; analyzing the captured plurality of first frames in the first mode to determine at least one second mode from a plurality of second modes for the video capture; capturing a plurality of second frames of the video in accordance with the at least one second mode from the plurality of second modes; recording metadata associated with the captured plurality of second frames in the second mode; applying the metadata associated with the plurality of second frames onto the plurality of first frames to generate a plurality of modified first frames; and merging the plurality of modified first frames with the plurality of second frames to generate an output video.

20 Claims, 5 Drawing Sheets

(51) Int. Cl.

| | |
|---|---|
| ***H04N 19/46*** | (2014.01) |
| ***H04N 23/62*** | (2023.01) |
| ***H04N 23/667*** | (2023.01) |

(56) References Cited

U.S. PATENT DOCUMENTS

| | | | | |
|---|---|---|---|---|
| 10,979,624 | B2 | 4/2021 | Liu et al. | |
| 11,019,252 | B2 * | 5/2021 | Petrescu | H04N 1/00244 |
| 11,431,894 | B2 | 8/2022 | Shreve et al. | |
| 2007/0153111 | A1 | 7/2007 | Kato | |
| 2010/0079589 | A1 | 4/2010 | Yoshida et al. | |
| 2010/0194963 | A1 * | 8/2010 | Terashima | H04N 23/63 348/E5.022 |
| 2011/0074971 | A1 * | 3/2011 | Kwon | H04N 23/633 348/222.1 |
| 2012/0176505 | A1 | 7/2012 | Kim et al. | |
| 2015/0043895 | A1 | 2/2015 | Hoshika | |
| 2016/0055884 | A1 | 2/2016 | Zaletel | |
| 2017/0076156 | A1 * | 3/2017 | Borel | G11B 27/031 |
| 2018/0124299 | A1 * | 5/2018 | Brook | H04N 23/676 |
| 2018/0158487 | A1 | 6/2018 | Kimura et al. | |
| 2019/0370948 | A1 * | 12/2019 | Tico | H04N 25/60 |
| 2019/0379818 | A1 | 12/2019 | Brook | |
| 2020/0221096 | A1 | 7/2020 | Toma et al. | |
| 2020/0329194 | A1 * | 10/2020 | Sonenblick | H04N 23/651 |

FOREIGN PATENT DOCUMENTS

| | | | |
|---|---|---|---|
| EP | 3 736 676 | A1 | 11/2020 |
| WO | 2020/060598 | A1 | 3/2020 |
| WO | 2020/158069 | A1 | 8/2020 |

OTHER PUBLICATIONS

Communication issued on Feb. 6, 2024 by the Intellectual Property India for Indian Patent Application No. 202141060688.

International Search Report (PCT/ISA/210) issued on Mar. 24, 2023 by the International Searching Authority for International Patent Application No. PCT/KR2022/020603.

Written Opinion (PCT/ISA/237) issued on Mar. 24, 2023 by the International Searching Authority for International Patent Application No. PCT/KR2022/020603.

Communication dated Nov. 11, 2025 issued by the Intellectual Property India in Indian Patent Application No. 202141060688.

* cited by examiner

400

500

METHOD AND SYSTEM FOR CAPTURING A VIDEO IN A USER EQUIPMENT

CROSS-REFERENCE TO RELATED APPLICATION(S)

This application is a continuation of PCT International Application No. PCT/KR2022/020603, which was filed on Dec. 16, 2022, and claims priority to Indian Patent Application No. 202141060688, filed on Nov. 14, 2022, which claims priority to Indian Patent Application No. 202141060688, filed on Dec. 24, 2021, in the Indian Patent Office, the disclosures of each of which are incorporated by reference herein their entirety.

BACKGROUND

1. Field

The embodiments of the present disclosure relate to field of capturing videos, and more particularly to a method and system for capturing a video and applying one or more modes based on analyzing frames of the video.

2. Description of Related Art

Traditionally, while recording a video, if a user selects a predefined transition, the predefined transition is applied to an entire duration of the video. The predefined transition may be a mode change or a filler effect. When the video is being recorded, the user may not be aware about a recording mode relevant to the video being recorded to get the best recording quality. Sometimes, the user may ignore the quality because the user is in fear of failing to properly record a scene. Furthermore, the user requires time and effort to explore the right mode.

One conventional solution discloses a method of dynamically creating a video composition. The method includes recording an event using a video composition creation program in response to a first user record input. The method further includes selecting a transition using the video composition creation program in response to a user transition selection input, the video composition creation program automatically combining the first video clip and the selected transition to create the video composition.

Another conventional solution discloses a camera mode that is selected by estimating a high dynamic range (HDR), motion, and a light intensity with respect to a scene of the image or video to capture. An image capture device detects whether HDR is present in a scene of an image to capture, and includes a motion estimation unit to determine whether motion is detected within the scene, and further includes a light intensity estimation unit to determine whether a scene luminance for the scene meets a threshold.

However, none of the above-mentioned conventional solutions discloses an analysis of each frame of the video and fetches relevant settings configuration based on the analysis of each frame. Furthermore, a user selection is not considered while recording the video in a particular mode.

Therefore, there lies a need of a solution that can overcome above-mentioned drawbacks and problems with the existing solutions.

SUMMARY

This summary is provided to introduce a selection of concepts, in a simplified format, that are further described in the detailed description of the embodiments of the present disclosure. This summary is neither intended to identify key or essential concepts of the embodiments of the present disclosure and nor is it intended for determining the scope of the embodiments of the present disclosure.

According to an aspect of the disclosure, a method for capturing a video in a User Equipment (UE) includes capturing a plurality of first frames of a video of a scene in a first mode upon detecting an initiation of a video capture; analyzing the captured plurality of first frames in the first mode to determine at least one second mode from a plurality of second modes for the video capture; capturing a plurality of second frames of the video in accordance with the at least one second mode from the plurality of second modes; recording metadata associated with the captured plurality of second frames in the second mode; applying the metadata associated with the plurality of second frames onto the plurality of first frames to generate a plurality of modified first frames; and merging the plurality of modified first frames with the plurality of second frames to generate an output video.

According to an aspect of the disclosure, a system for generating a modified video based on analyzing a video captured in a User Equipment (UE), includes: a memory storing one or more instructions; and one or more processors operatively coupled to the memory; wherein the one or more instructions, when executed by the one or more processors, cause the system to: capture a plurality of first frames of a video of a scene in a first mode upon detecting an initiation of a video capture; analyze the captured plurality of first frames in the first mode to determine at least one second mode from a plurality of second modes for the video capture; capture a plurality of second frames of the video in accordance with the at least one second mode from the plurality of second modes; and record metadata associated with the captured plurality of second frames in the second mode; apply the metadata associated with the plurality of second frames onto the plurality of first frames to generate a plurality of modified first frames; and merge the plurality of modified first frames applied with the metadata, and the plurality of second frames to generate an output video.

According to an aspect of the disclosure, a non-transitory computer readable medium having instructions stored therein, which when executed by a processor for capturing a video in a User Equipment (UE), cause the processor to execute a method including: capturing a plurality of first frames of a video of a scene in a first mode upon detecting an initiation of a video capture; analyzing the captured plurality of first frames in the first mode to determine at least one second mode from a plurality of second modes for the video capture; capturing a plurality of second frames of the video in accordance with the at least one second mode from the plurality of second modes; recording metadata associated with the captured plurality of second frames in the second mode; applying the metadata associated with the plurality of second frames onto the plurality of first frames to generate a plurality of modified first frames; and merging the plurality of modified first frames with the plurality of second frames to generate an output video.

To further clarify advantages and features of the embodiments of the present disclosure, a more particular description of the embodiments of the present disclosure will be rendered by reference to specific embodiments thereof, which is illustrated in the appended drawings. It is appreciated that these drawings depict only typical embodiments of the present disclosure and are therefore not to be considered limiting of its scope. The embodiments of the present disclosure will be described and explained with additional specificity and detail with the accompanying drawings.

BRIEF DESCRIPTION OF DRAWINGS

These and other features, aspects, and advantages of the present embodiments of the present disclosure will become better understood when the following detailed description is read with reference to the accompanying drawings in which like characters represent like parts throughout the drawings, wherein.

Figure 1:
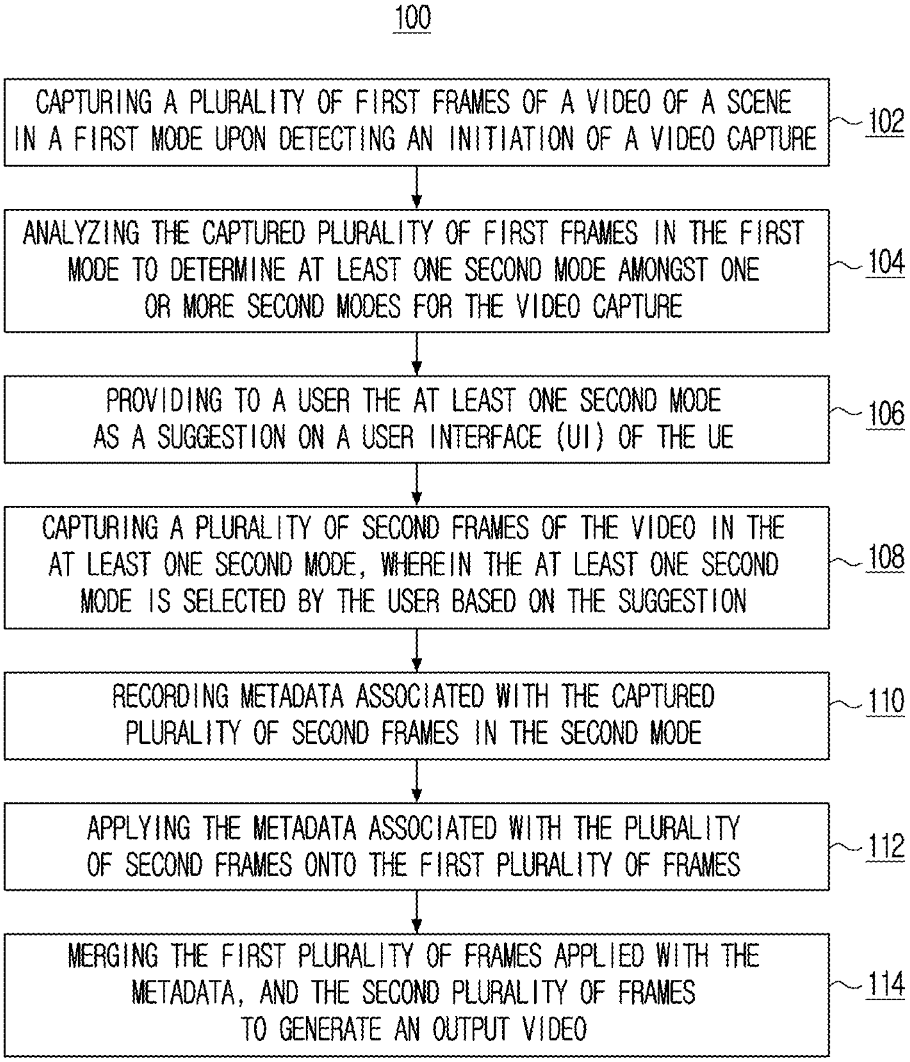
FIG. 1 illustrates a block diagram depicting a method for capturing a video in a Equipment UE, in accordance with one or more embodiments of the present subject matter.

Further, skilled artisans will appreciate that elements in the drawings are illustrated for simplicity and may not have necessarily been drawn to scale. For example, the flow charts illustrate the method in terms of the most prominent operations involved to help to improve understanding of aspects of the present embodiments of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For promoting an understanding of the principles of the embodiments of the present disclosure, reference will now be made to the embodiment illustrated in the drawings and specific language will be used to describe the same. It will nevertheless be understood that no limitation of the scope of the embodiments of the present disclosure is thereby intended, such alterations and further modifications in the illustrated system, and such further applications of the principles of the embodiments of the present disclosure as illustrated therein being contemplated as would normally occur to one skilled in the art to which the embodiments of the present disclosure relate.

It will be understood by those skilled in the art that the foregoing general description and the following detailed description are explanatory of the embodiments of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in one or more embodiments", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which the embodiments of the present disclosure belong. The system, methods, and examples provided herein are illustrative only and not intended to be limiting.

FIG. 1 illustrates a flowchart depicting a method 100 for capturing a video in an user equipment (UE), in accordance with one or more embodiments of the present subject matter. The process illustrated in FIG. 1 may be performed by one or more processors.

At operation 102, the method 100 includes capturing a plurality of first frames of a video of a scene in a first mode upon detecting an initiation of a video capture.

At operation 104, the method 100 includes analyzing the captured plurality of first frames in the first mode to determine at least one second mode from a plurality of second modes for the video capture.

At operation 106, the method 100 includes providing to a user the at least one second mode as a suggestion or recommendation on a User Interface (UI) of the UE.

At operation 108, the method 100 includes capturing a plurality of second frames of the video in the at least one second mode, where the at least one second mode is selected by the user based on the suggestion or recommendation. For example, the UE may include a display where an option for selecting the at least one second mode is provided. Upon selection of the at least one second mode, the at least one second mode may be activated. In one or more examples the user may be provided with a two or more second modes as suggestions or recommendations.

At operation 110, the method 100 includes recording metadata associated with the captured plurality of second frames in the second mode.

At operation 112, the method 100 includes applying the metadata associated with the plurality of second frames onto the plurality of first frames.

At operation 114, the method 100 includes merging the plurality of first frames applied with the metadata, and the plurality of second frames to generate an output video. In one or more examples, after the least one second mode is determined in operation 104, operation 106 may be skipped where the determined at least one second mode is automatically activated.

Figure 2:
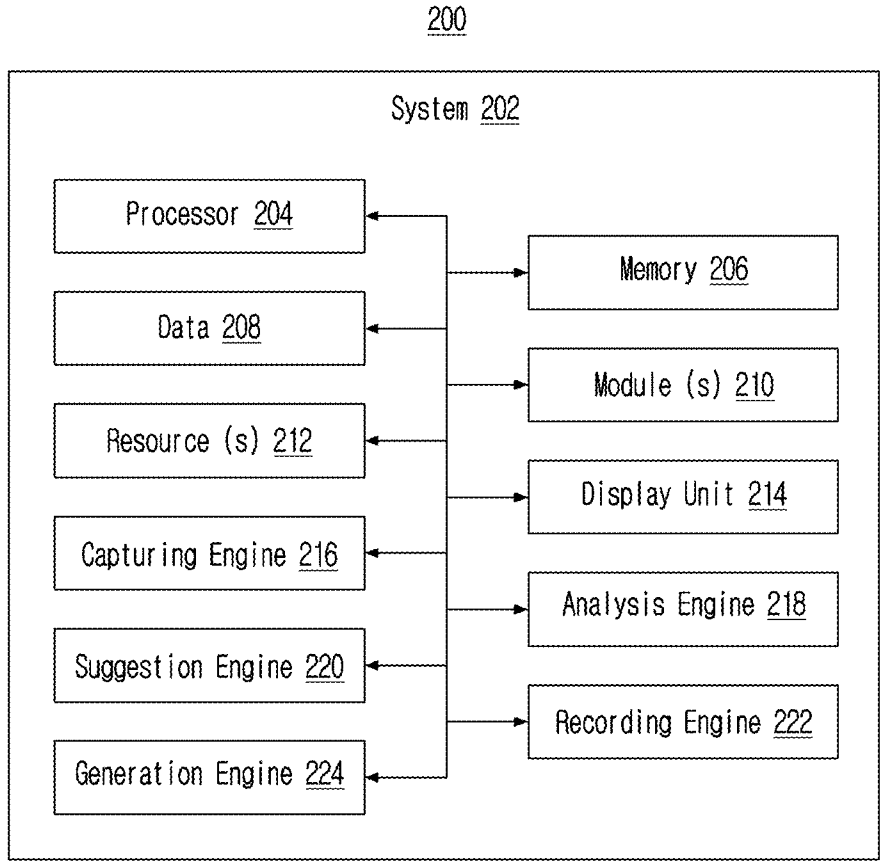
FIG. 2 illustrates a schematic block diagram of a system configured to generate a modified video based on analyzing a video captured in a UE, in accordance with one or more embodiments of the present subject matter.

FIG. 2 illustrates a schematic block diagram 200 of a system 202 configured to generate a modified video based on analyzing a video captured in a UE, in accordance with one or more embodiments of the present subject matter. The system 202 may be incorporated in an electronic device.

Examples of the electronic device may include, but are not limited to, a Personal Computer (PC), a laptop, a smart phone, and a tablet, or any other suitable device known to one of ordinary skill in the art. The modified video may be generated based on a suggestion suggested to a user. The user may select the suggestion presented on a User Interface (UI) as an option.

In one or more examples, the system 202 may include a processor 204, a memory 206, data 208, module (s) 210, resource (s) 212, a display unit 214, a capturing engine 216, an analysis engine 218, a suggestion engine 220, a recording engine 222, and a generation engine 224.

In one or more embodiments, the processor 204, the memory 206, the data 208, the module (s) 210, the resource (s) 212, the display unit 214, the capturing engine 216, the analysis engine 218, a suggestion engine 220, the recording engine 222, and the generation engine 224 may be communicably coupled to one another.

As would be appreciated, the system 202, may be understood as one or more of a hardware, a software, a logic-based program, a configurable hardware, and the like. In one or more examples, the processor 204 may be a single processing unit or a number of units, all of which could include multiple computing units. The processor 204 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 204 may be configured to fetch and/or execute computer-readable instructions and/or data stored in the memory 206. Each of components 210-224 may be implemented by individual circuitry or a combination of hardware and software.

In one or more examples, the memory 206 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 206 may include the data 208. The data 208 serves, amongst other things, as a repository for storing data processed, received, and generated by one or more of the processor 204, the memory 206, the module (s) 210, the resource (s) 212, the display unit 214, the capturing engine 216, the analysis engine 218, a suggestion engine 220, the recording engine 222, and the generation engine 224.

In one or more examples, the module(s) 210, amongst other things, may include routines, programs, objects, components, data structures, etc., which perform particular tasks or implement data types. The module(s) 210 may also be implemented as, signal processor(s), state machine(s), logic circuitries, and/or any other device or component that manipulate signals based on operational instructions.

Further, the module(s) 210 may be implemented in hardware, as instructions executed by at least one processing unit, e.g., processor 204, or by a combination thereof. The processing unit may be a general-purpose processor that executes instructions to cause the general-purpose processor to perform operations or, the processing unit may be dedicated to performing the required functions. In another aspect of the present subject matter, the module(s) 210 may be machine-readable instructions (software) which, when executed by a processor/processing unit, may perform any of the described functionalities.

In some example embodiments, the module(s) 210 may be machine-readable instructions (software) which, when executed by a processor 204/processing unit, perform any of the described functionalities.

The resource(s) 210 may be physical and/or virtual components of the system 202 that provide inherent capabilities and/or contribute towards the performance of the system 202. Examples of the resource(s) 210 may include, but are not limited to, a memory (e.g., the memory 206), a power unit (e.g., a battery), a display unit (e.g., the display unit 214) etc. The resource(s) 210 may include a power unit/battery unit, a network unit, etc., in addition to the processor 204, and the memory 206.

The display unit 214 may display various types of information (for example, media contents, multimedia data, text data, etc.) to the system 202. The display unit 214 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

At least one of the plurality of modules may be implemented through an AI model or a machine learning model. A function associated with AI may be performed through the non-volatile memory, the volatile memory, and the processor.

The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

In one or more examples, being provided through learning may mean that, by applying a learning technique to a plurality of learning data, a predefined operating rule or AI model of a desired characteristic is made. The learning may be performed in a device itself in which AI according to one or more embodiments is performed, and/o may be implemented through a separate server/system. In one or more examples, the training may be performed based on a dataset from multiple users. For example, the AI model may be trained on a remote server collecting data from multiple users. After the AI model is trained, the AI model may be provided on the UE where the AI model is further refined based on a user's particular use of the UE.

In one or more examples, the AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning technique may be a method for training a predetermined target device (e.g., a robot) using a plurality of learning data to cause, allow, or control the target device to make a determination or prediction. Examples of learning techniques include, but are not limited to, supervised learning, unsupervised learning, semi-supervised learning, or reinforcement learning.

According to the disclosure, in a method of the electronic device, a method for capturing a video by using image data as input data for an artificial intelligence model. The artificial intelligence model may be obtained by training. In one or more examples, "obtained by training" may mean that a predefined operation rule or artificial intelligence model configured to perform a desired feature (or purpose) is obtained by training a basic artificial intelligence model with multiple pieces of training data by a training technique. The artificial intelligence model may include a plurality of neural network layers. Each of the plurality of neural network layers includes a plurality of weight values and performs neural network computation by computation between a result of computation by a previous layer and the plurality of weight values. AI models may be trained using techniques that help them learn from data and improve their performance. These techniques include, but are not limited to hyperparameter tuning, transfer learning, data augmentation, data preparation, supervised learning, model validation.

Visual understanding is a technique for recognizing and processing things as does human vision and includes, e.g., object recognition, object tracking, image retrieval, human recognition, scene recognition, 3D reconstruction/localization, or image enhancement.

Referring to FIG. 2, the capturing engine 216 may be configured to capture a plurality of first frames of a video of a scene. The plurality of frames of the video may be captured in a first mode by the capturing engine 216. The plurality of frames may be captured upon detection of an initiation of a video capture. The detection may be performed by the capturing engine 216, and the video capture may be performed by a video capturing device. Examples of the video capturing device may include, but are not limited to, a CCTV, a video camera, a smartphone, and the like. The first mode may be amongst a plurality of modes in which the video may be recorded. The first mode may be a default mode for capturing the video.

Upon capture of the plurality of frames by the capturing engine 216, the analysis engine 218 may be configured to analyze the captured plurality of first frames in the first mode. The analysis may be performed in order to determine at least one second mode from a plurality of second modes for the video capture. Examples of the at least one second mode may include, but are not limited to, a night shot mode, a portrait mode, a ST-HV mode, a bokeh mode, and a slow-motion mode. In one or more examples, the night-shot mode may brighten shots in low-light situations. In one or more examples, in a portrait mode, a device may create a depth-of-field effect to capture photos with a sharp focus on a subject with a blurred background. In one or more examples, the bokeh mode, a device may focus on an immediate subject while blurring out a background. In one or more examples, in the slow-motion mode, the frames of a moving image may be slowed down to a predetermined speed.

In one or more examples, the suggestion engine 220 may be configured to provide the user the at least one second mode as a suggestion on the UI of the UE. The user may select the at least second mode and the processor 202 may be configured to treat the selection of the at least one second mode as a command for using the at least second mode for enhanced video capture. In one or more examples, the suggestion engine 220 may be bypassed or disabled such that a determined at least one second mode is automatically activated without user input.

In one or more examples, upon receiving the selection of the suggestion by the processor 202, the capturing engine 216 may be configured to capture a plurality of second frames of the video. The plurality of second frames may be captured in the at least one second mode selected by the user based on the suggestion. In one or more examples, the recording engine 222 may be configured to record metadata associated with the captured plurality of second frames in the second mode. In one or more examples the metadata may be one or configurations of the UE (e.g., brightness, focus, zoom, white balance, etc.) capturing the plurality of images in the second mode.

Furthermore, the generation engine 224 may be configured to apply the metadata associated with the plurality of second frames onto the plurality of first frames. Upon applying the metadata, the generation engine 224 may be configured to merge the plurality of first frames applied with the metadata, and the plurality of second frames to generate an output video. The metadata may include one or more settings indicating a mode of the video capture associated with the video capturing device capturing the video. Examples of the one or more settings may include, but are not limited to, a Dynamic Shot Condition (DSP), a time stamp, a location, and a scene detection. For applying the metadata, the generation engine 224 may be configured to apply at least one of the first mode and the at least one second mode on the video at the one or more timestamps where a requirement for a change of a mode amongst the first mode and the at least one second mode is detected.

Figure 3:
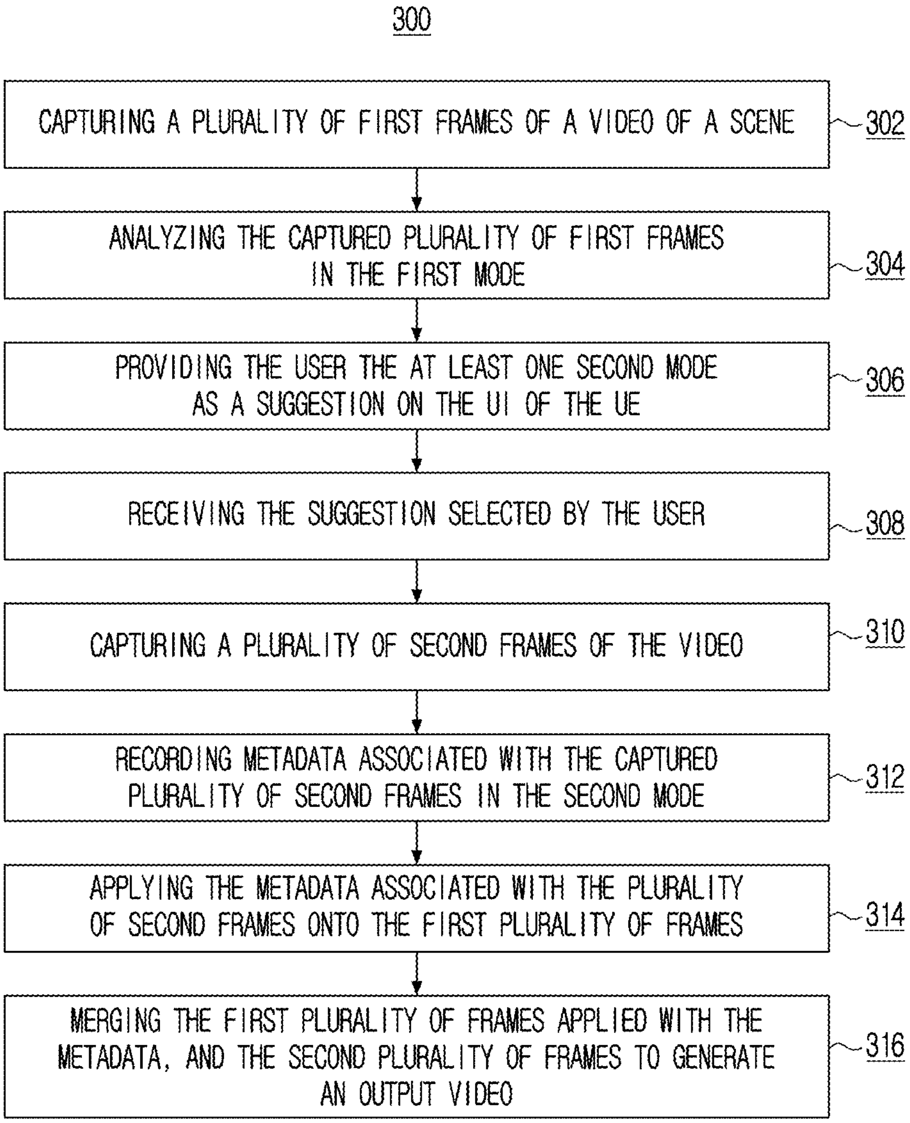
FIG. 3 illustrates an operational flow diagram depicting a process for generating a modified video based on analyzing a video captured in a UE, in accordance with one or more embodiments of the present subject matter.

FIG. 3 illustrates an operational flow diagram 300 depicting a process for generating a modified video based on analyzing a video captured in a UE, in accordance with one or more embodiments of the present subject matter. The process 300 may be performed by the system 202 as referred in the FIG. 2. Further, the process 300 may be based on a suggestion suggested to a user. The user may select the suggestion presented on an interface as an option.

At operation 302, the process 300 may include capturing a plurality of first frames of a video of a scene. The plurality of frames of the video may be captured in a first mode by the capturing engine 216 as referred to in FIG. 2. The plurality of frames may be captured upon detection of an initiation of a video capture. The detection may be performed by the capturing engine 216 and the video capture may be performed by a video capturing device. The first mode may be a default mode for capturing the video.

At operation 304, the process 300 may include analyzing the captured plurality of first frames in the first mode. The analysis may be performed by the analysis engine 218 as referred in the FIG. 2 upon capture of the plurality of frames by the capturing engine 216. The analysis may be performed in order to determine at least one second mode amongst one or more second modes for the video capture. Examples of the at least one second mode may include, but are not limited to, a night shot mode, a portrait mode, a ST-HV mode, a bokeh mode, and a slow-motion mode.

At operation 306, the process 300 may include providing the at least one second mode as a suggestion to the user on the UI of the UE. The suggestion may be automatically provided by the suggestion engine 220 as described above for FIG. 2.

At operation 308, the process 300 may include receiving the suggestion selected by the user at the processor 202 as described above FIG. 2. Furthermore, the process 300 may include treating the selection of the at least one second mode as a command for using the at least second mode for enhanced video capture.

At operation 310, the process 300 may include capturing a plurality of second frames of the video. The plurality of second frames may be captured by the capturing engine 216. The plurality of second frames may be captured in the at least one second mode selected by the user based on the suggestion.

At operation 312, the process 300 may include recording by the recording engine 222 as referred in the FIG. 2, metadata associated with the captured plurality of second frames in the second mode. The metadata may include one or more settings indicating a mode of the video capture associated with the video capturing device capturing the video. Examples of the one or more settings may include, but are not limited to, a Dynamic Shot Condition (DSP), a time stamp, a location, and a scene detection. For applying the metadata, the generation engine 224 may be configured to apply at least one of the first mode and the at least one second mode on the video at the one or more timestamps where a requirement for a change of a mode amongst the first mode and the at least one second mode is detected.

At operation 314, the process 300 may include applying the metadata associated with the plurality of second frames onto the plurality of first frames to generate a plurality of modified first frames. The metadata may be applied by the generation engine 224 as referred in the FIG. 2.

At operation 316, the process 300 may include merging the plurality of first frames applied with the metadata, and the plurality of second frames to generate an output video. The plurality of frames may be merged by the generation engine 224.

Figure 4:
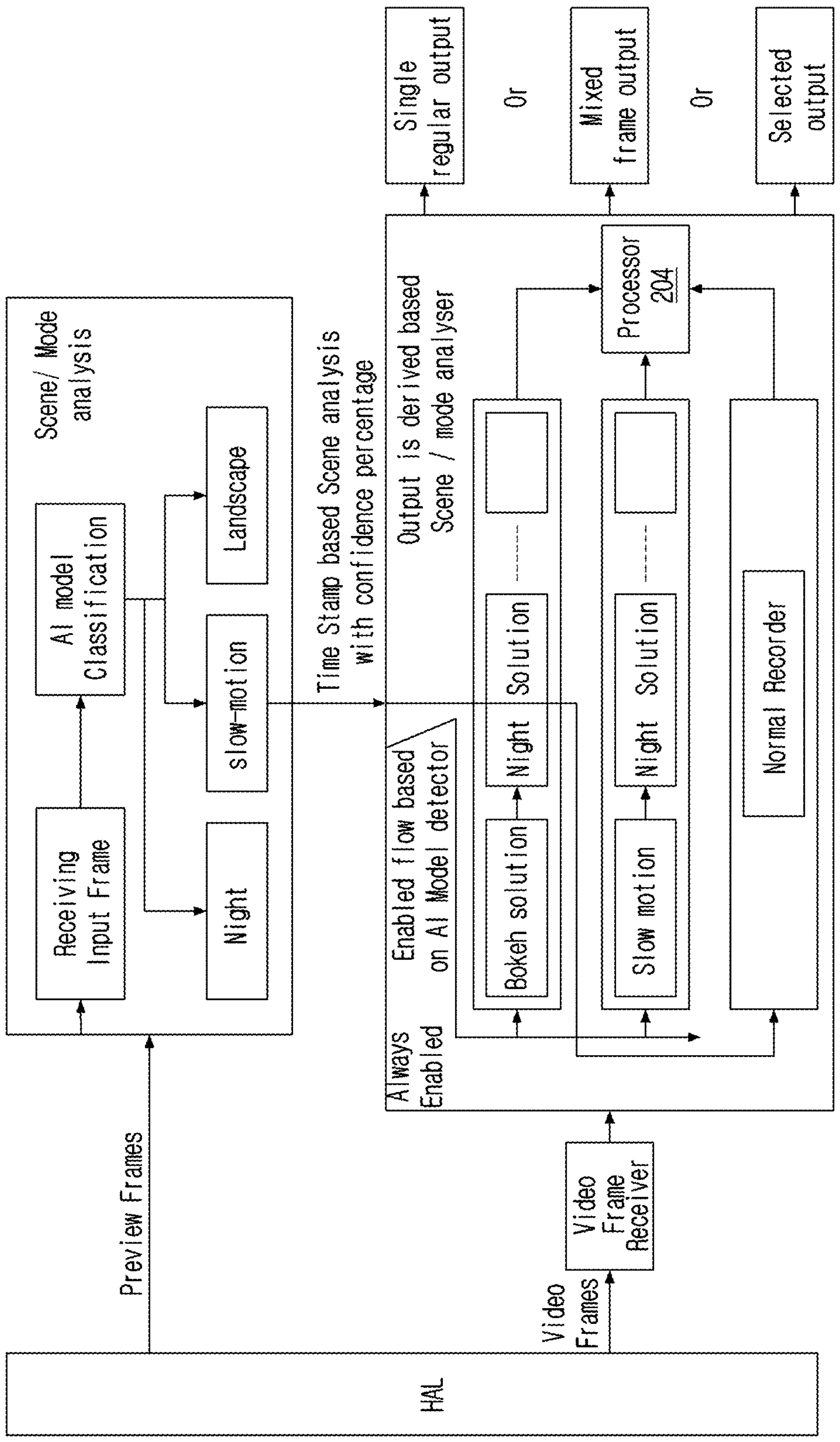
FIG. 4 illustrates a diagram depicting a method for generating a modified video based on analyzing a video captured in a UE, in accordance with one or more embodiments of the present subject matter.

FIG. 4 illustrates a diagram depicting a method 400 for generating a modified video based on analyzing a video captured in a UE, in accordance with one or more embodiments of the present subject matter. The method may include a Scene/Mode analysis operation and an Output Derivation operation.

The method 400 may include receiving preview frames as an input. The preview frames may be classified upon application of one or more Artificial Intelligence (AI) techniques by the Scene/Mode analysis operation. The preview frame may be classified amongst a night mode, a slow-motion mode, and a landscape mode. The method 400 may include suggesting at least one second mode to the user and receiving a command from the user. The command may indicate that the at least one second mode is selected by the user to be applied on the video being recorded. Examples of the at least one second mode may include, but are not limited to, a night shot mode, a portrait mode, a ST-HV mode, a bokeh mode, and a slow-motion mode.

Further, the method 400 may include recording metadata associated with a captured plurality of second frames in the second mode in the output derivation process. The metadata may include one or more settings indicating a mode of the video capture associated with the video capturing device capturing the video. Examples of the one or more settings may include, but are not limited to, a Dynamic Shot Condition (DSP), a time stamp, a location, and a scene detection.

The method 400 may also include applying the metadata associated with the plurality of second frames onto a plurality of first frames and merging the plurality of first frames applied with the metadata, and the plurality of second frames to generate an output video.

Figure 5:
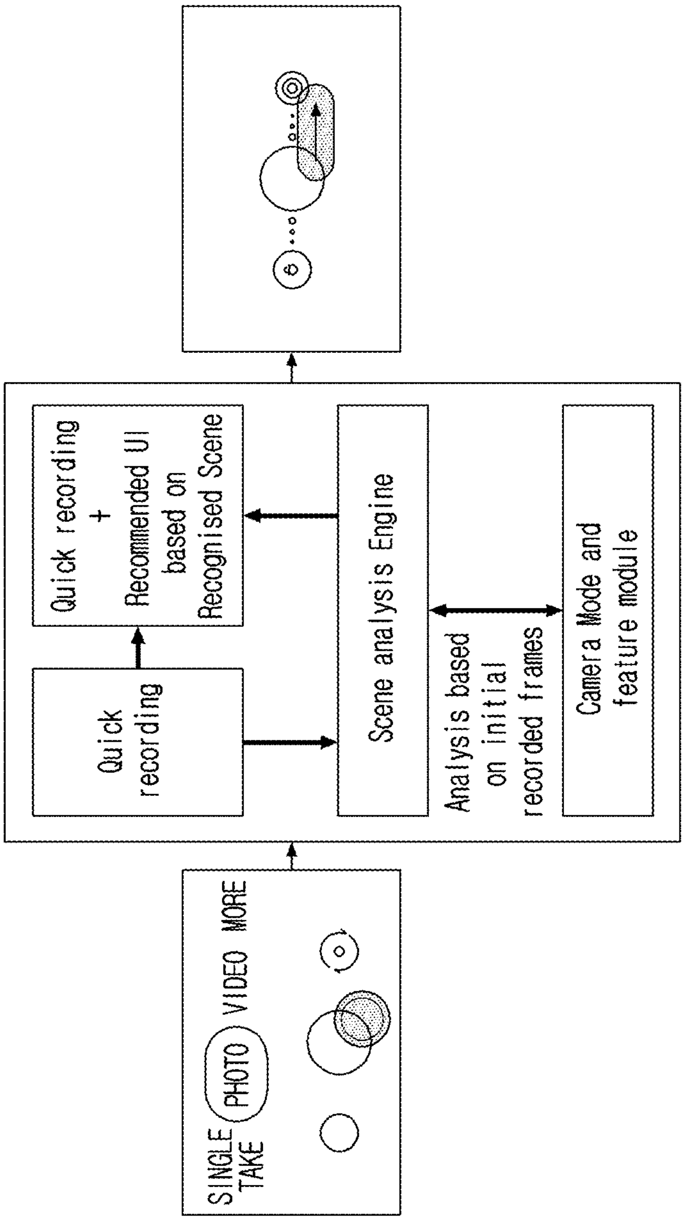
FIG. 5 illustrates a diagram depicting an operational flow diagram depicting a method for applying at least one second mode on a video, in accordance with one or more embodiments of the present subject matter.

FIG. 5 illustrates a diagram depicting an operational flow diagram depicting a method 500 for applying at least one second mode on a video, in accordance with one or more embodiments of the present subject matter. The video may be initially recorded in a first mode. The first mode may be a default mode. Examples of the at least one second mode may include, but are not limited to, a night shot mode, a portrait mode, a ST-HV mode, a bokeh mode, and a slow-motion mode. The at least one second mode may be determined based on analyzing a plurality of first frames associated with the video in the first mode.

Further, the at least one second mode may be suggested as an option to a user and upon receiving a confirmation from the user, the at least one second mode may be applied on the video. The method 500 may be applied by the system 202 as described above in FIG. 2.

As illustrated in FIG. 5, a user may apply a long press to invoke a quick take. A quick recording may be performed and provided to a scene analysis engine that provides a recommendation of one or more second modes based on the quick recording. Based on the scene analysis (e.g., due to motion in the scene), a single take icon may appear. This icon may appear with the relevant features of the main mode such as: 1. Portrait video with relevant effect (Big circle or Studio light); 2. Slow-mo with relevant frame rate.

While specific language has been used to describe the present subject matter, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method for capturing a video in a User Equipment (UE), the method comprising:

capturing a plurality of first frames of a video of a scene in a first mode upon detecting an initiation of a video capture;

analyzing the captured plurality of first frames in the first mode to determine at least one second mode from a plurality of second modes for the video capture;

capturing a plurality of second frames of the video in accordance with the at least one second mode from the plurality of second modes;

recording metadata associated with the captured plurality of second frames in the second mode, the metadata comprising one or more settings indicating a mode of the video capture associated with a capturing device capturing the video;

applying the metadata associated with the plurality of second frames onto the plurality of first frames by applying the mode indicated by the one or more settings onto the plurality of first frames to generate a plurality of modified first frames; and merging the plurality of modified first frames with the plurality of second frames to generate an output video.

2. The method as claimed in claim 1, wherein the one or more settings comprises a Dynamic shot condition (DSP), a time stamp, a location, and a scene detection.

3. The method as claimed in claim 1, wherein applying the metadata comprises:

applying at least one of the first mode and the at least one second mode on the video at one or more timestamps where a requirement for a change of a mode amongst the first mode and the at least one second mode is detected.

4. The method as claimed in claim 1, wherein the first mode is a default mode for capturing the video.

5. The method as claimed in claim 1, wherein the at least one second mode comprises a night shot mode, a portrait mode, a ST-HV mode, a bokeh mode, and a slow-motion mode.

6. A system for generating a modified video based on analyzing a video captured in a User Equipment (UE), the system comprising:

a memory storing one or more instructions; and one or more processors operatively coupled to the memory;

wherein the one or more instructions, when executed by the one or more processors, cause the system to:

capture a plurality of first frames of a video of a scene in a first mode upon detecting an initiation of a video capture;

analyze the captured plurality of first frames in the first mode to determine at least one second mode from a plurality of second modes for the video capture;

capture a plurality of second frames of the video in accordance with the at least one second mode from the plurality of second modes; and record metadata associated with the captured plurality of second frames in the second mode, the metadata comprising one or more settings indicating a mode of the video capture associated with a capturing device capturing the video;

apply the metadata associated with the plurality of second frames onto the plurality of first frames by applying the mode indicated by the one or more settings onto the plurality of first frames to generate a plurality of modified first frames; and merge the plurality of modified first frames applied with the metadata, and the plurality of second frames to generate an output video.

7. The system as claimed in claim 6, wherein the one or more settings comprises a Dynamic Shot Condition (DSP), a time stamp, a location, and a scene detection.

8. The system as claimed in claim 6, wherein the one or more instructions further cause the system, to apply the metadata to:

apply at least one of the first mode and the at least one second mode on the video at one or more timestamps where a requirement for a change of a mode amongst the first mode and the at least one second mode is detected.

9. The system as claimed in claim 6, wherein the first mode is a default mode for capturing the video.

10. The system as claimed in claim 6, wherein the at least one second mode comprises a night shot mode, a portrait mode, a ST-HV mode, a bokeh mode, and a slow-motion mode.

11. The method of claim 1, wherein the at least one second mode is displayed on the UE, and wherein the capturing of the plurality of second frames of the video is performed after a selection of the at least one second mode.

12. The method of claim 1, wherein analyzing the captured plurality of first frames further comprises:

inputting the captured plurality of first frames into a machine learning model to determine the at least one second mode.

13. The method of claim 12, wherein the machine learning model is a neural network.

14. The system of claim 6, wherein the at least one second mode is displayed on the UE, and the plurality of second frames of the video is captured after a selection of the at least one second mode.

15. The system of claim 6, wherein the one or more instructions further cause the system, to analyze the captured plurality of first frames, to:

input the captured plurality of first frames into a machine learning model to determine the at least one second mode.

16. A non-transitory computer readable medium having instructions stored therein, which when executed by a processor for capturing a video in a User Equipment (UE), cause the processor to execute a method comprising:

capturing a plurality of first frames of a video of a scene in a first mode upon detecting an initiation of a video capture;

analyzing the captured plurality of first frames in the first mode to determine at least one second mode from a plurality of second modes for the video capture;

capturing a plurality of second frames of the video in accordance with the at least one second mode from the plurality of second modes;

recording metadata associated with the captured plurality of second frames in the second mode, the metadata comprising one or more settings indicating a mode of the video capture associated with a capturing device capturing the video;

applying the metadata associated with the plurality of second frames onto the plurality of first frames by applying the mode indicated by the one or more settings onto the plurality of first frames to generate a plurality of modified first frames; and merging the plurality of modified first frames with the plurality of second frames to generate an output video.

17. The non-transitory computer readable medium according to claim 16, wherein the one or more settings comprises a Dynamic shot condition (DSP), a time stamp, a location, and a scene detection.

18. The non-transitory computer readable medium as claimed in claim 17, wherein applying the metadata comprises:

applying at least one of the first mode and the at least one second mode on the video at one or more timestamps where a requirement for a change of a mode amongst the first mode and the at least one second mode is detected.

19. The non-transitory computer readable medium as claimed in claim 16, wherein the first mode is a default mode for capturing the video.

20. The method as claimed in claim 16, wherein the at least one second mode comprises a night shot mode, a portrait mode, a ST-HV mode, a bokeh mode, and a slow-motion mode.

* * * * *